United States Patent
Goodrich et al.

(10) Patent No.: US 6,502,319 B1
(45) Date of Patent: Jan. 7, 2003

(54) APPARATUS FOR PRODUCING A VISIBLE LINE OF LIGHT ON A SURFACE

(75) Inventors: Gary Goodrich, Union City, CA (US); Larry Lemer, Marietta, GA (US)

(73) Assignee: LeveLite Technology, Inc., Mountain View, CA (US)

( * ) Notice: Subject to any disclaimer, the term of this patent is extended or adjusted under 35 U.S.C. 154(b) by 0 days.

(21) Appl. No.: 09/684,696

(22) Filed: Oct. 4, 2000

(51) Int. Cl.[7] .................. G01C 15/02; G01B 11/26; B43L 13/00
(52) U.S. Cl. .................. 33/286; 33/227; 33/DIG. 21
(58) Field of Search .................. 33/286, 227, 228, 33/281, 282, 283, 285, 451, DIG. 21

(56) References Cited

U.S. PATENT DOCUMENTS

| | | | | |
|---|---|---|---|---|
| 5,539,990 A | * | 7/1996 | Le | 33/281 |
| 5,782,003 A | * | 7/1998 | Bozzo | 33/285 |
| 5,836,081 A | * | 11/1998 | Orosz, Jr. | 33/DIG. 21 |
| 6,163,969 A | * | 12/2000 | Jan et al. | 33/282 |
| 6,195,902 B1 | * | 3/2001 | Jan et al. | 33/286 |
| 6,202,312 B1 | * | 3/2001 | Rando | 33/227 |

* cited by examiner

*Primary Examiner*—Christopher W. Fulton
(74) *Attorney, Agent, or Firm*—Thomas M. Freiburger

(57) ABSTRACT

An apparatus and method for efficiently generating a visible line of light on a surface such as a wall or a floor for the purpose of facilitating the layout process used in construction. The apparatus comprises a light beam generator projecting a beam of visible light on a surface. Reference marking elements on the instrument correspond to the light beam's position. One or more level vials may also be included for indicating vertical and horizontal, as well as a magnet for mounting and a reference bracket for a stud-finder instrument.

31 Claims, 8 Drawing Sheets

APPARATUS FOR PRODUCING A VISIBLE LINE OF LIGHT ON A SURFACE

BACKGROUND OF THE INVENTION

This invention relates to hand tools, and in particular the invention is concerned with a hand tool for projecting a reference beam of visible light for precise alignment on floors and walls.

For some time laser beams have been used in construction for level references, vertical references and layout on floors and walls. Typically a construction worker marks the floor or walls indicating the location of walls, windows, or other building elements to be constructed. A chalk line is often used to permanently mark the walls or floors. This is a two man job with one man holding one end of the chalked string while the other snaps it, releasing chalk dust which makes the mark.

The most common prior laser device is a simple carpenter's level with level vials and with a laser beam projector attached. See FIG. 1. Many thousands of these are in use today. U.S. patents in this area include Genho U.S. Pat. No. 4,221,483, Rando U.S. Pat. No. 6,009,630 and others. Although indicating level, these levels do a poor job of projecting a beam on a floor or wall. LeveLite Technology, Inc., the assignee of this invention, makes a product for producing two beams of visible light on the floor for the purpose of laying out a 90° corner. It is described in U.S. patent application No. Ser. No. 09/264,371, U.S. Pat. No. 6,202,312, incorporated herein by reference. This instrument uses a collimated beam of light and an adjustable cylinder lens to convert the round beam into a fan of light and thus project a line on the surface. This is not a very efficient use of the laser diode light because of the natural divergence of the diode and cropping of the beam in collimation. Typically the laser diode beam divergence is 30° in one axis and 8° on the transverse axis. About half the light is lost in the collimation process. In addition, the line can be focused for only one distance. Such an optical system is shown in plan view in FIG. 2 herein and in side view in FIG. 3 herein, and is the present state of the art. Both the problems of efficient use of the laser light and focusing continuously along a line are solved by the current invention.

SUMMARY OF THE INVENTION

This invention allows the user to project a highly visible line on a surface. In addition it allows the line to be adjusted to true vertical or horizontal with the aid of a level vial when used on a vertical surface, e.g. a wall. An attachment to a stud-finder instrument is further provided. In some cases a magnet facilitates holding the unit to metal studs. The instrument is partially described in Disclosure Document No. 476310.

The simple, efficient optical system is the important feature of this invention. The instrument provides a highly visible line which can temporarily act as a chalk line for the purpose of marking points along the line, when requiring a more permanent mark, or for operations along the line with the laser line in place. These and other objects, advantages and features of the invention will be apparent from the following description of a preferred embodiment, considered along with the accompanying drawings.

DESCRIPTION OF PREFERRED EMBODIMENTS

Figure 3:
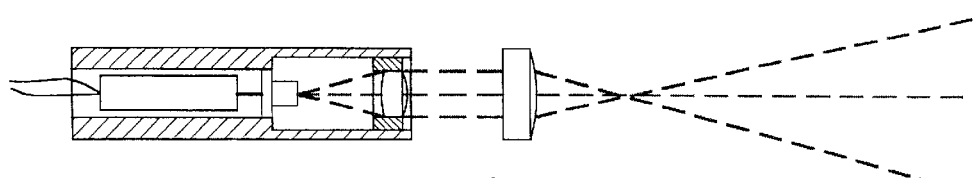
FIGS. 2 and 3 are elevation and plan views showing a prior art laser line projector schematically using a cylinder lens.
Figure 2:
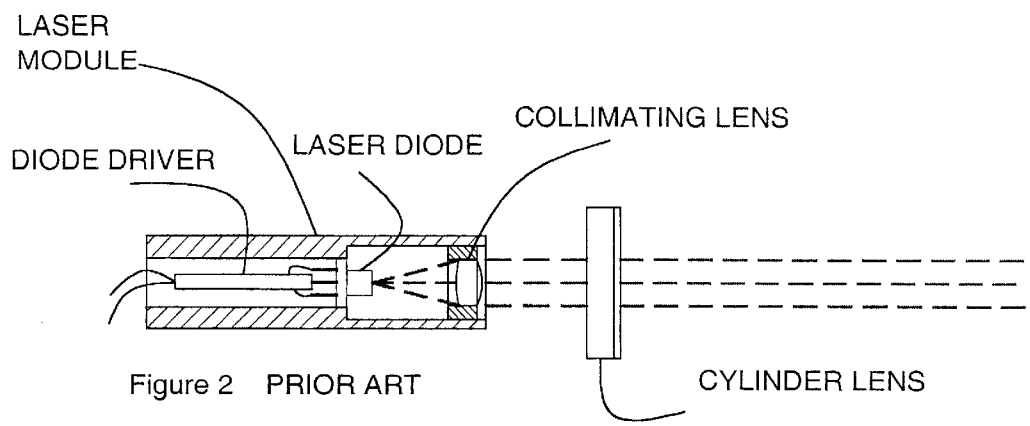
Figure 1:
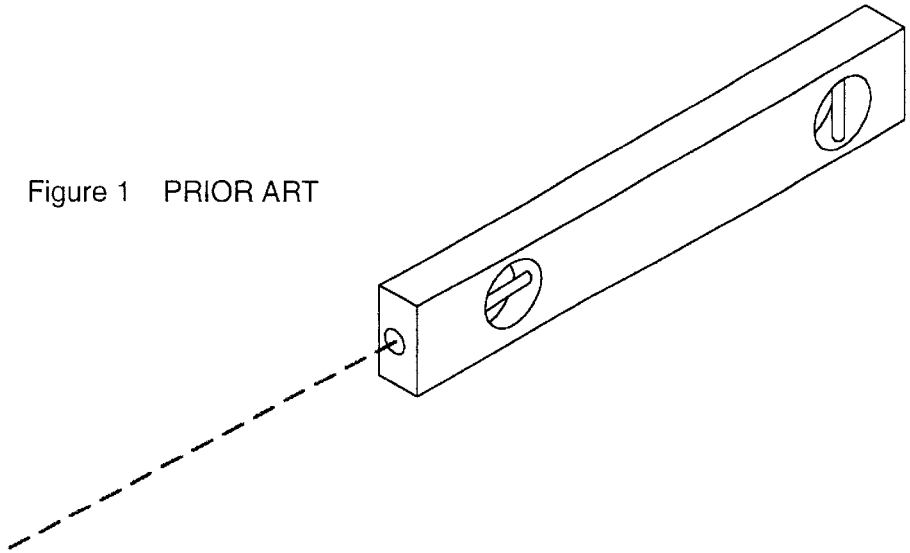
FIG. 1 is a perspective view showing a prior art carpenter's level with projected laser beam.
Figure 5:
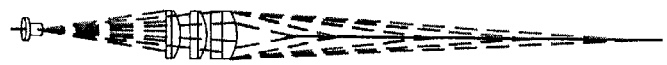
FIGS. 4 and 5 are elevation and plan views illustrating the principle of line-projection according to the invention.
Figure 4:
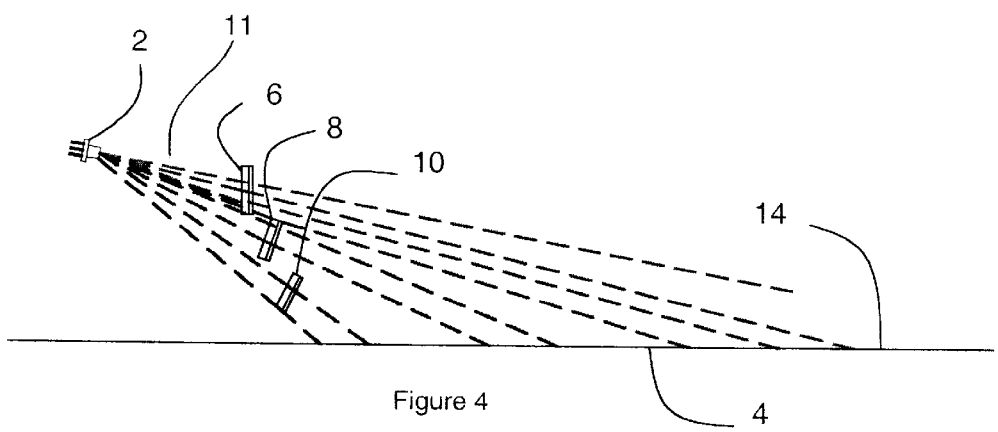

An optical system is shown in FIGS. 4 and 5. A laser diode 2 is positioned above a surface 4 to be marked, with the wide divergence angle of the laser, i.e. the major or long axis, perpendicular to the surface. In other words, a plane which is longitudinal relative to the laser diode and which includes the long axis of the beam is perpendicular to the surface. Cylinder lenses 6, 8, 10 project a beam 11 from the laser diode 2 onto a continuous line 14. The widths of the lenses are chosen to collect all the light from the narrow divergence angle (short axis) of the diode, substantially without cropping. The use of a plurality of lenses in the direction of the wide divergence (long axis) allows most of the light to be collected making the system efficient. The ability of each lens to be adjusted for a particular distance to produce a fine line is superior to the prior art; focus adjustment for distance can be done either by use of different focal length lenses or by adjustment of distance from the diode to each lens. The figures show how substantially all of the laser power in the wide and narrow divergence angles of the diode is projected into a tapering fan and into a line on a surface.

Figure 7:
FIGS. 6 and 7 are elevation and plan views similar to FIGS. 4 and 5 but showing a different embodiment.
Figure 6:
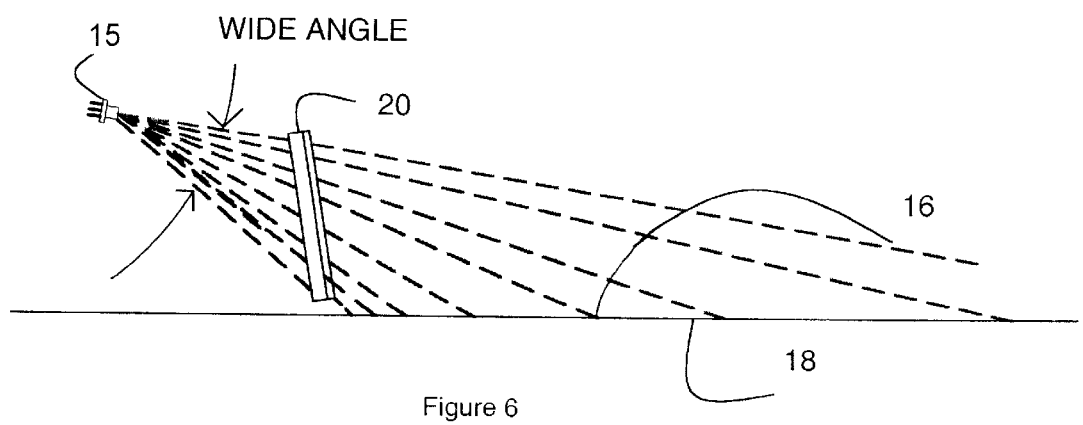

Another preferred embodiment of the optical system is shown in two views in FIGS. 6 and 7. A laser diode 15 projects a line 16 on a surface 18 using a single cylinder lens 20. The lens is tipped to provide the best focus for the entire surface by varying continuously the distance between the lens and the diode along the wide angle or long axis of the diode's beam. This provides variation for best focus on the line 16 on the surface. The diode is located preferably about 25 mm to 125 mm above (or away from) the surface to provide the angle needed to distribute the light along the floor (or other surface on which the device is used).

Figure 8:
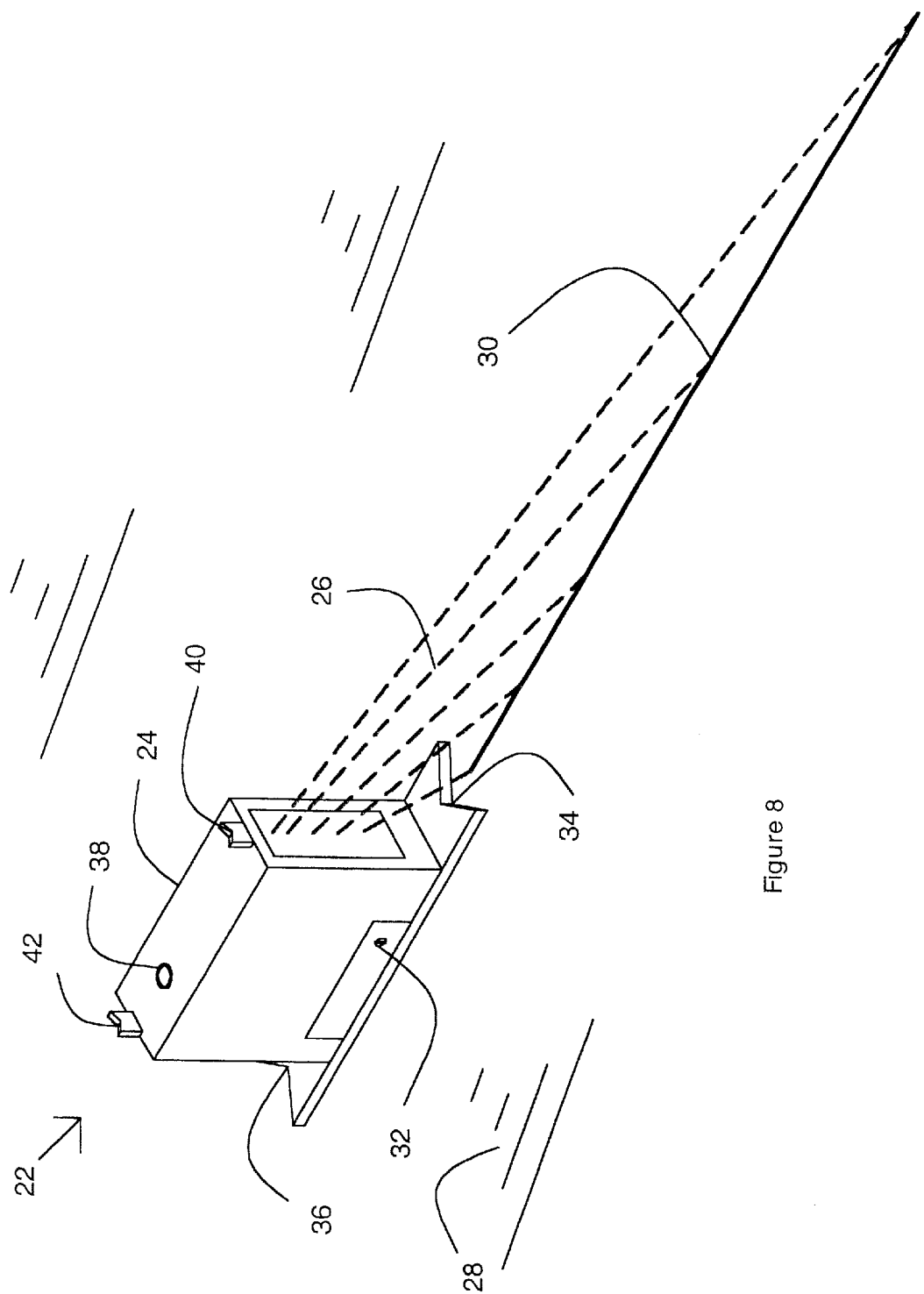
FIG. 8 is a schematic perspective view showing a laser instrument projecting a line on a surface in accordance with the principles of the invention.
Figure 9:
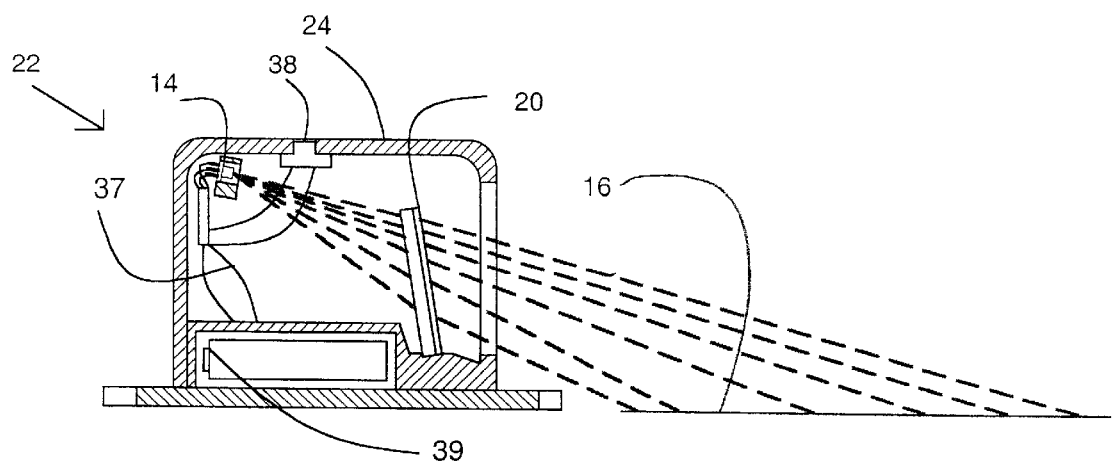
FIG. 9 is a sectional elevation view schematically showing the instrument of FIG. 8, with some elements omitted for clarity.

A preferred embodiment of an instrument is indicated generally by 22 in FIG. 8. A housing 24 contains the projection system described above. A fan-shaped beam 26 is projected onto a surface 28 to form a line 30. The housing has a battery door 32 and marking notches 34 and 36 which are in the same plane as the projected beam 26 and are used for positioning the line 30 and the instrument on marks on the floor during layout. An on-off switch 38 and sights 40 and 42 are in the plane of the beam 26 and may be used for sighting the instrument for desired alignment. Details of the internal construction of the instrument 22 are shown in FIG. 9. A battery 39 and wires 37 are included.

Figure 10:
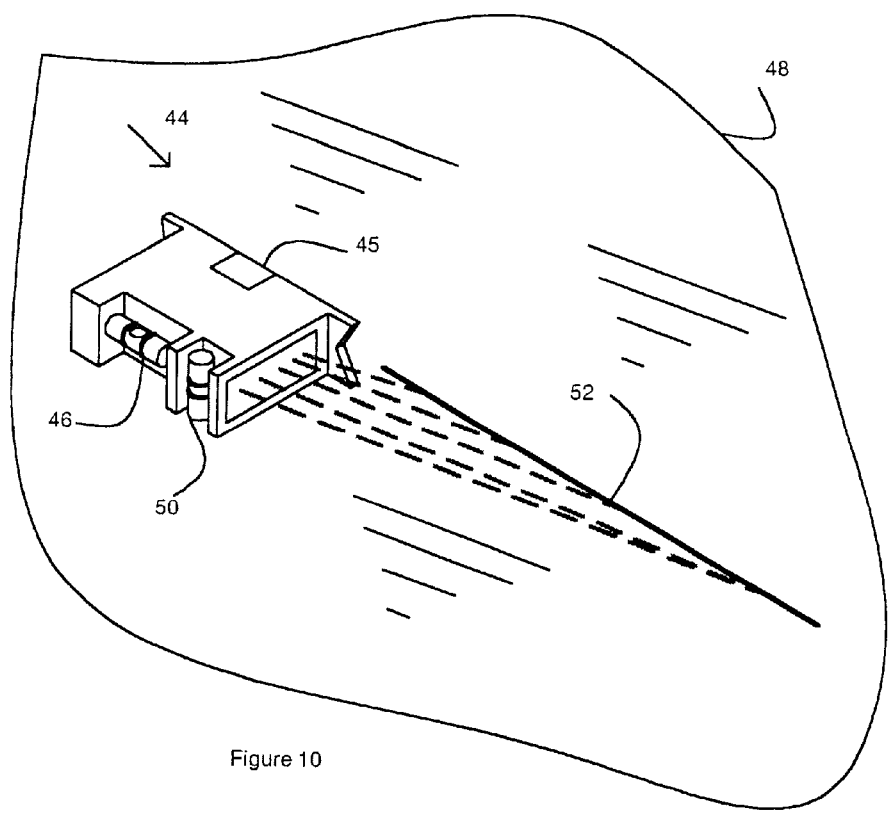
FIGS. 10 and 11 are perspective views illustrating use of the instrument on a wall, to project a line which may be horizontal or vertical on the wall surface.

A slightly modified instrument 44 shown in FIG. 10 is the same as 22 except for the addition of a horizontal indicating level vial 46. A magnet 45 is provided to hold the instrument to a steel stud as may be necessary from time to time. The sights and switch of FIGS. 8 and 9 have been removed for clarity in FIG. 10. The unit is positioned on a vertical wall 48. A second level vial 50 for indicating vertical is also mounted to the line projector. In this figure a horizontal line 52 is projected on the wall.

Figure 11:
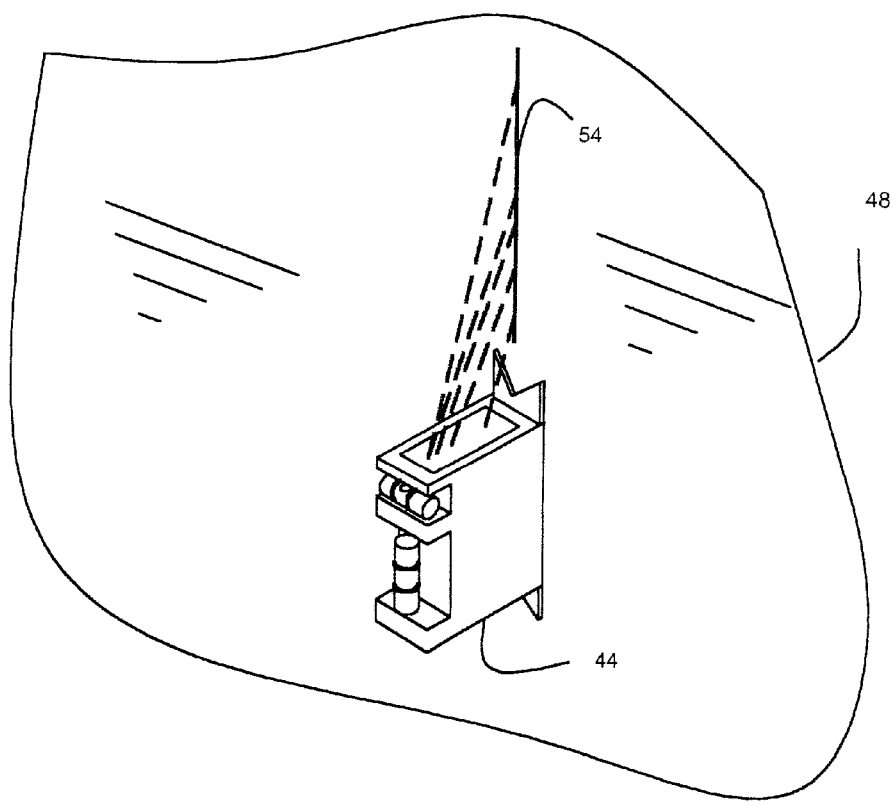

FIG. 11 shows the instrument of FIG. 10 positioned on the vertical wall projecting a vertical line 54 on the wall 48.

Figure 12:
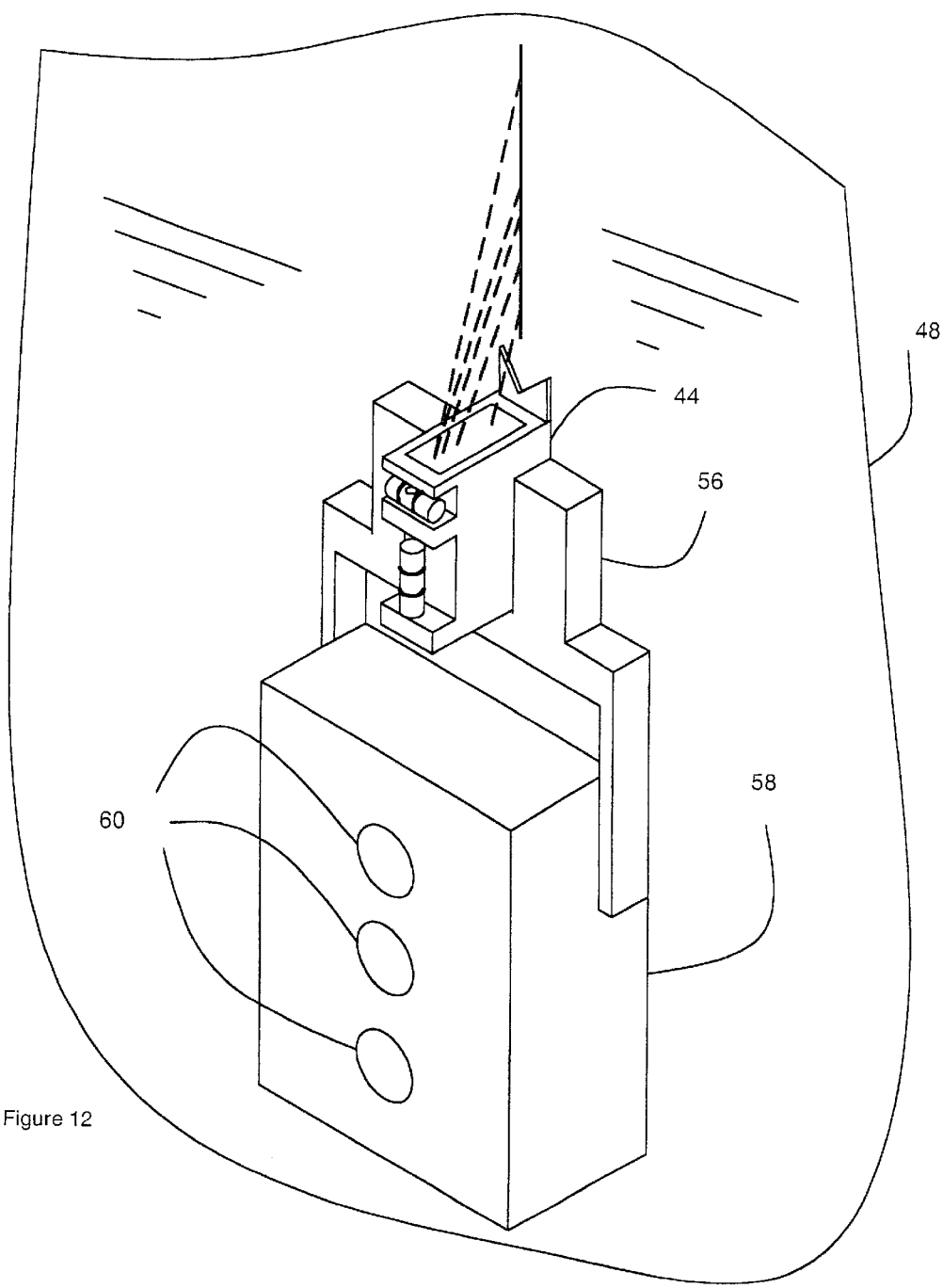
FIG. 12 is a perspective view showing the instrument used along with a stud finder, to project a vertical line indicating location of an entire stud.

FIG. 12 shows the instrument 44 of FIGS. 10 and 11 on the vertical wall 48 with a bracket 56 attached to the instrument. The bracket holds a stud-finder 58 which indicates the location of a stud behind a wall with its indicator lights 60. Using this combination instrument one location of the stud may be used to locate the entire length of a vertical stud. This eliminates the need to find the stud at several locations up and down the wall.

Figure 15:
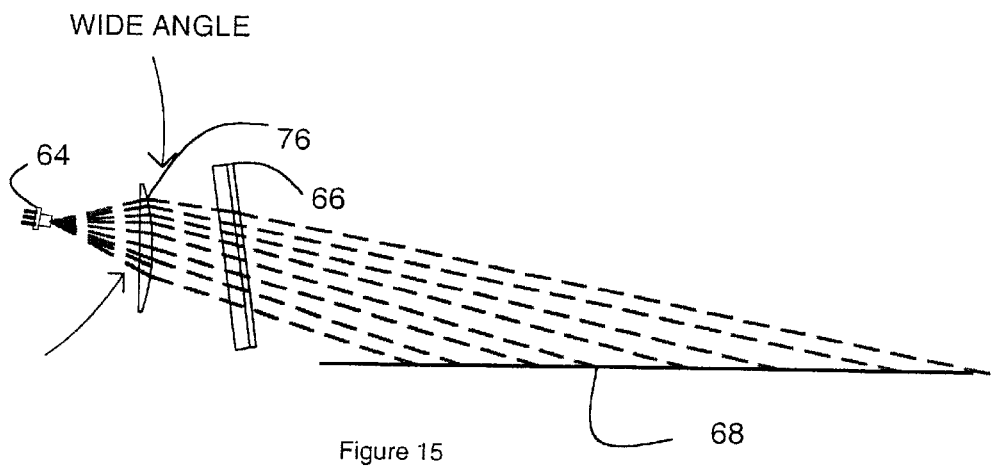
FIGS. 13, 14 and 15 are schematic side views showing the components of the invention projecting a line on a surface and showing three different methods for utilizing the entire wide angle of the diverging beam along the long axis.
Figure 14:
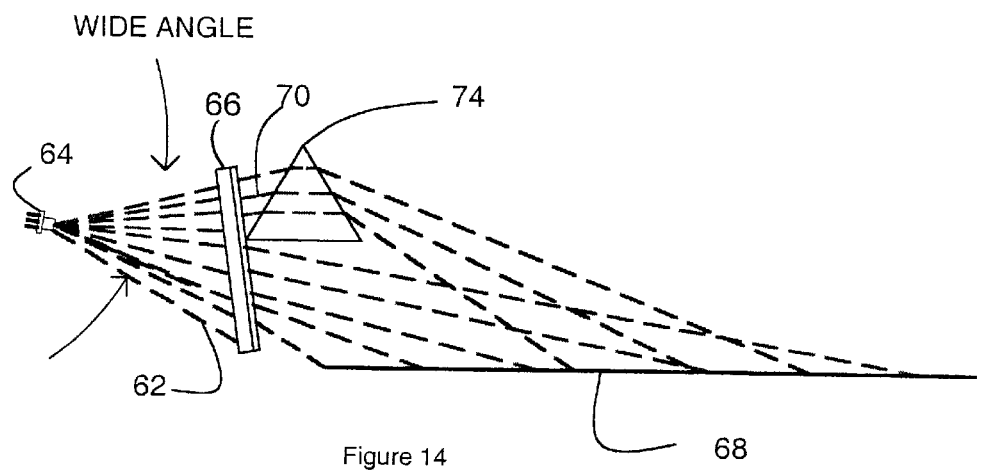
Figure 13:
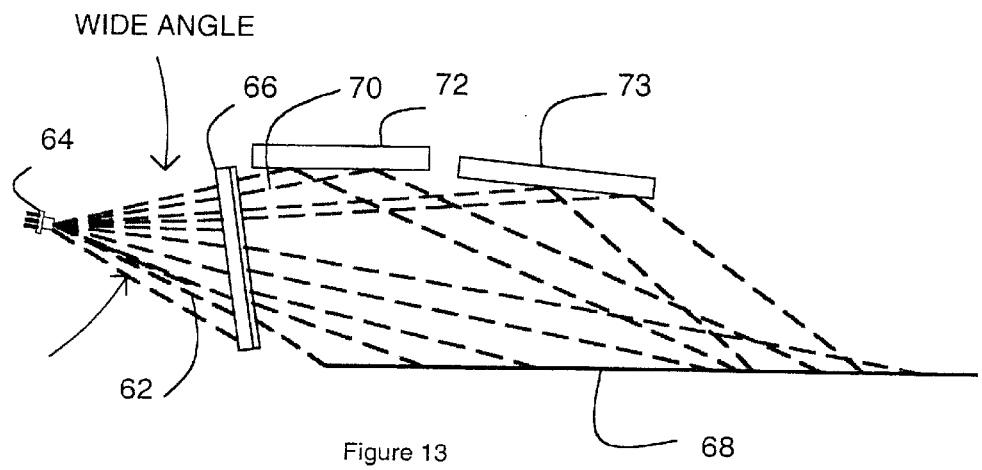

In another preferred embodiment the light in the wide angle divergence or long axis direction of the diode is used efficiently by employing one or more mirrors to reflect part of the light back onto the line as shown in FIG. 13. A laser diode 64 directs a beam of light 62 to a cylinder lens 66 to form a line 68. A portion of the light 70 exiting the lens 66 strikes mirrors 72 and 73 and is directed onto the line 68 increasing its brightness, at the distant portion of the line where the line is weakest. A prism 74 can also be used to redirect the portion 70 back onto the line 68 as shown in FIG. 14. FIG. 15 shows that a positive cylinder lens 76, oriented transversely to the cylinder lens 66, can be used to narrow the divergence of the diode laser beam as it reaches the cylinder lens 66 to efficiently use the power from the laser diode in this preferred embodiment. Instead of two separate cylinder lenses 66 and 76, a hybrid lens could be fashioned to accomplish both functions.

Figure 16:
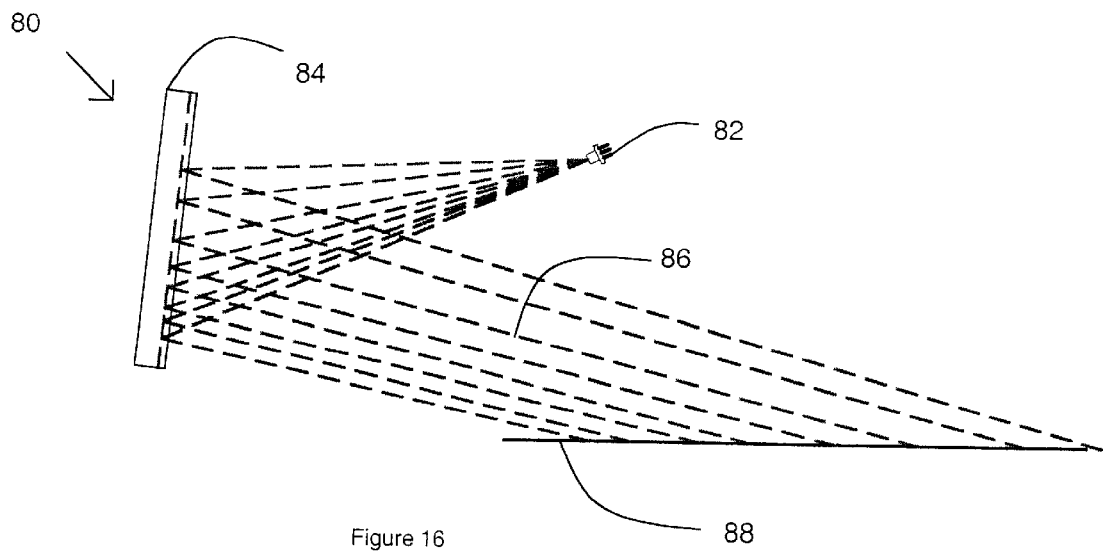
FIGS. 16 and 17 are schematic side views showing another form of the invention using cylindrical concave mirrors for focus in the narrow angle of the beam.
Figure 17:
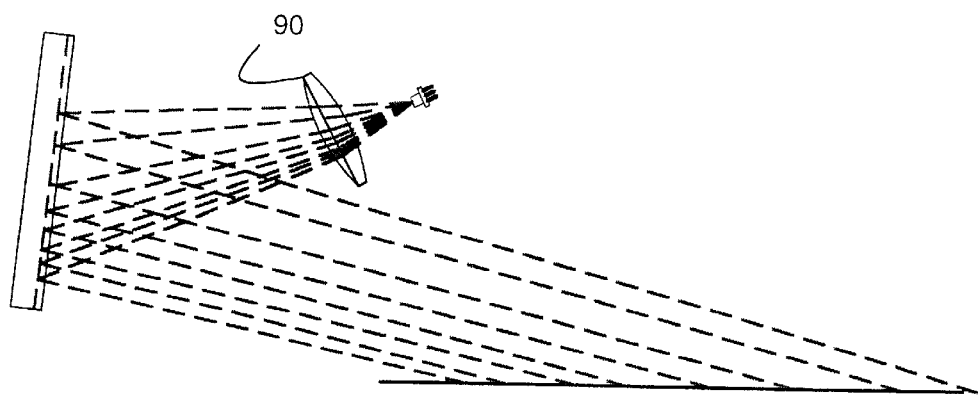

In another preferred embodiment the light beam is focused in the narrow angle of divergence with a cylindrical mirror instead of a cylinder lens, achieving similar beam distribution and focus. FIG. 16 shows the projector 80 comprising a laser diode 82 and cylindrical reflecting surface 84 projecting the beam, diverging in its wide angle as shown, from the laser diode into a fan of line 88 on a surface. The back-reflection arrangement shown allows the beam conveying element 84 to be placed at a proper angle of tilt to achieve optimum focus along the length of the line 88, as shown with the lens in FIGS. 6 and 13–15. The beam divergence in the wide angle can be further controlled by a lens 90 shown in FIG. 17 which otherwise contains the same elements of FIG. 16. It is also possible to include the optical power of the lens 90 in the mirror 84, by providing a mirror which curves concavely in the transverse direction, i.e. appearing arcuate and concave in side view, rather than linear as in FIGS. 16 and 17. This becomes an expensive optical element but is theoretically possible. In addition, the focus correction for a range of distance, as achieved by the tilted conveying element, could be realized using a concave cylinder reflecting surface that varies in radius of concavity along its length, to provide varying focal length for this narrow angle of divergence.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. A method for producing a line of laser light on a surface, comprising:

positioning a laser diode, of the type that produces an oblong beam diverging unequally in wide and narrow angles of divergence along two perpendicular axes, a long axis and a short axis, at a position spaced away from a surface on which a reference line is to be projected, with the laser diode oriented such that a longitudinal plane through the diode that includes the long axis is substantially perpendicular to said surface, and focusing the laser beam to converge the beam in the narrow angle of divergence on said short axis, to bring the beam into approximate focus along a line on said surface, while allowing the beam to continue to diverge along the wide angle of divergence, whereby the wide angle of divergence of the laser diode's beam in the long axis is used to generate a line on the surface, in a simple and efficient optical system.

2. The method of claim 1, wherein the step of positioning the laser diode includes tilting the aim of the laser diode obliquely downwardly toward the surface.

3. The method of claim 1, wherein the focusing step comprises placing a converging lens in the path of the laser diode's beam and tilting the converging lens so as to be closer to the laser diode at a lens end more distant from the surface, and farther from the laser diode at an opposite lens end closer to the surface, to a lens orientation to maximize the focus of the laser beam along the line, in portions of the line both near the laser diode and distant from the laser diode.

4. The method of claim 1, wherein the step of focusing the beam comprises placing a plurality of beam-converging lenses at serial positions along said long axis of the laser diode's beam, and focusing a different portion of the beam to a different distance with each of the plurality of lenses.

5. The method of claim 1, wherein the diverging beam on the long axis, after focusing, is oriented such that portions of the beam most remote from the surface are diverging away from the surface, and including reflecting such diverging portions toward the surface to enhance the brightness of the line in portions of the line most remote from the diode.

6. The method of claim 1, wherein the diverging beam on the long axis, after focusing, is oriented such that portions of the beam most remote from the surface are diverging away from the surface, and including redirecting such diverging portions of the beam using a prism, toward the surface to a portion of the line most remote from the diode, to enhance the brightness of the line.

7. The method of claim 1, further including reducing the wide angle of divergence of the beam using optics placed in the path of the beam, such that the beam continues to diverge at a lesser angle along the long axis, whereby the beam can be used to project the line at a low angle to the surface without wasting portions of the beam which would otherwise be directed away from the surface.

8. The method of claim 7, wherein said optics comprise a hybrid lens which both reduces the wide angle of divergence and performs the step of focusing the laser beam to converge the beam in the narrow angle of divergence.

9. The method of claim 1, wherein the laser diode is positioned about 25 to 125 mm away from the surface.

10. The method of claim 1, wherein the step of focusing the laser beam to converge the beam in the narrow angle of divergence comprises placing a concave mirror in the path of the beam such that the beam as reflected from the concave mirror is directed obliquely toward the surface and converges to form the line on the surface.

11. The method of claim 1, wherein the laser diode is in a housing, and further including attaching a stud finder to the housing, in a position of alignment such that the line projected by the laser diode onto the surface is aligned with indicators showing the location of wall studs, said surface being a vertical wall, and including adjusting the housing such that the projected line is in vertical orientation on the wall surface, thus indicating a protracted length of the stud in the wall.

12. A laser instrument for producing a line on a surface, comprising:
   a housing having a base side and having an exit window for a laser beam,
   a laser diode in the housing producing an oblong beam which diverges unequally in wide and narrow angles of divergence along two perpendicular axes, a long axis and a short axis, and the diode being oriented such that a longitudinal plane through the diode that includes the long axis of the beam is perpendicular to the housing base, and
   optical means for converging the laser beam in its narrow angle, on the short axis, while allowing the beam to continue diverging on the long axis, to substantially focus the beam to a narrow line of light, the line being in front of the housing and substantially in said longitudinal plane, and extending away from the base of the housing.

13. The instrument of claim 12, wherein the laser diode is positioned about 25 mm to 125 mm above the base side of the housing.

14. The instrument of claim 12, wherein the laser diode is tilted obliquely downwardly toward a base plane in which the base side of the instrument lies.

15. The instrument of claim 12, wherein the optical means includes a series of cylinder lenses at serial positions along said long axis of the laser diode's beam, each of the cylinder lenses being configured to focus a different portion of the beam to a different distance to form a part of the line of light.

16. The instrument of claim 15, wherein the focal length of each cylinder lens is in the range of about 25 mm to 40 mm.

17. The instrument of claim 12, wherein the housing includes a battery for powering the laser diode and an on/off switch to selectively power the diode.

18. The instrument of claim 17, wherein said reference marking notches are included at front and back ends of the base side.

19. The instrument of claim 12, wherein the housing's base side additionally includes at least one reference marking notch lying within said longitudinal plane.

20. The instrument of claim 12, wherein the optical means comprises a converging lens in the housing, in the path of the laser diode's beam, the converging lens being tilted so as to be closer to the diode at a lens end more distant from the surface, and farther from the diode at an opposite lens end closer to the surface, the tilt being such as to maximize the focus of the laser beam along the line, in portions both near to and remote from the instrument.

21. The instrument of claim 20, wherein the focal length of each cylinder lens is in the range of about 25 mm to 40 mm.

22. The instrument of claim 12, further including a pair of alignment sights on the housing, the alignment sights being spaced apart and lying within said longitudinal plane.

23. The instrument of claim 12, further including a horizontal-indicating level vial secured to the housing and positioned so as to permit leveling the line of light when the instrument is used with its base side essentially in a vertical plane, flat against a substantially vertical surface.

24. The instrument of claim 23, further including a vertical-indicating level vial, oriented so as to allow adjustment of the instrument to produce a vertical line of light when the instrument is used with its base side flat against a substantially vertical surface.

25. The instrument of claim 12, further including a vertical-indicating level vial, oriented so as to allow adjustment of the instrument to produce a vertical line of light when the instrument is used with its base side flat against a substantially vertical surface.

26. The instrument of claim 12, the laser diode in the housing being aimed obliquely toward a base plane in which the base side of the instrument lies, and being so oriented that portions of the beam most remote from said plane are diverging away from the base plane, and including a mirror positioned to reflect such diverging portions toward the base plane to enhance the brightness of the line of light.

27. The instrument of claim 12, the laser diode in the housing being aimed obliquely toward a base plane in which the base side of the instrument lies, and being so oriented that portions of the beam most remote from said plane are diverging away from the base plane, and including a prism positioned to redirect such diverging portions of the beam toward the base plane to enhance the brightness of the line of light.

28. The instrument of claim 12, further including a positive lens placed in the path of the beam so as to reduce the wide angle of divergence of the beam, such that the beam continues to diverge at a lesser angle along the long axis, whereby the beam can be used to project the line of light at a low angle to the surface without wasting portions of the beam which would otherwise be directed away from the surface.

29. The instrument of claim 12, in combination with a stud finder and a bracket configured to attach to the instrument's housing and to the stud finder, the stud finder having indicators to show the location of a wall stud and the bracket holding the instrument in a position such that said longitudinal plane through the diode includes the indicator on the stud finder, whereby the instrument can be used on a vertical stud wall to locate a projected length of a wall stud.

30. The instrument of claim 29, further including a vertical-indicating level vial, oriented so as to allow adjustment of the instrument to produce a vertical line of light when the instrument is used with its base side flat against a substantially vertical surface.

31. A method for producing a line of laser light on a surface, comprising:

positioning a laser diode, producing a beam whose cross section has two perpendicular axes, at a position spaced away from a surface on which a reference line is to be projected, with the laser diode oriented such that a longitudinal plane through the diode that includes one of said two axes is substantially perpendicular to said surface, and focusing the laser beam to converge the beam along the other of said two axes, to bring the beam into approximate focus along a line on said surface, while allowing the beam to continue to diverge along said one axis, producing an elongated beam cross section along said one axis, whereby the elongated cross section of the beam along said one axis is used to generate a line on the surface, in a simple and efficient optical system.

* * * * *